US010358995B2

(12) United States Patent
Fujiwara et al.

(10) Patent No.: US 10,358,995 B2
(45) Date of Patent: Jul. 23, 2019

(54) ENGINE AUTOMATIC STOP/RESTART DEVICE

(75) Inventors: Michitaka Fujiwara, Kobe (JP); Tsuneo Tanabe, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 352 days.

(21) Appl. No.: 13/554,766

(22) Filed: Jul. 20, 2012

(65) Prior Publication Data
US 2013/0238224 A1 Sep. 12, 2013

(30) Foreign Application Priority Data

Mar. 6, 2012 (JP) .................................. 2012-48835

(51) Int. Cl.
F02D 41/06 (2006.01)
F02D 29/02 (2006.01)
(Continued)

(52) U.S. Cl.
CPC ........... *F02D 41/065* (2013.01); *F02D 29/02* (2013.01); *F02D 37/02* (2013.01); *F02D 41/009* (2013.01);
(Continued)

(58) Field of Classification Search
CPC ....... Y02T 10/48; Y02T 10/46; Y02T 10/142; Y02T 10/40; F02D 41/042; F02D 41/065;
(Continued)

(56) References Cited

U.S. PATENT DOCUMENTS 5,036,802 A * 8/1991 D'Amours ............ F02P 5/1502
123/41 E
8,942,910 B2 * 1/2015 Mikawa .................... F01L 1/04
123/90.17
(Continued)

FOREIGN PATENT DOCUMENTS

DE 11 2006 000 524 T5 4/2008
JP 63-113178 A 5/1988
(Continued)

OTHER PUBLICATIONS

Japanese Office Action dated Jan. 29, 2013 issued in Japanese Patent Application No. 2011-048835.
(Continued)

*Primary Examiner* — Hung Q Nguyen
*Assistant Examiner* — Brian P Monahon
(74) *Attorney, Agent, or Firm* — Sughrue Mion, PLLC; Richard C. Turner

(57) ABSTRACT

An engine automatic stop/restart device includes an ignition-prohibition-decision unit that prohibits an ignition for an engine, which is controlled by the ignition-control unit, when a reverse rotation of the engine is detected based on a crank-angle signal; and an ignition-prohibition-release-decision unit that releases an ignition prohibition, after the ignition is prohibited by the ignition-prohibition-decision unit; in which the ignition-prohibition-release-decision unit releases the ignition prohibition when regular rotational signals of the engine, of which count is greater than or equal to a predetermined count, is detected and an engine revolution number is greater than or equal to a predetermined revolution number, after the reverse rotation of the engine is detected, and before a crank is positioned at a compression top dead center of the engine.

3 Claims, 11 Drawing Sheets

(51) Int. Cl.

| | | |
|---|---|---|
| *F02D 41/00* | (2006.01) | |
| *F02D 37/02* | (2006.01) | |
| *F02N 11/08* | (2006.01) | |
| *F02N 15/06* | (2006.01) | |
| *F02P 5/15* | (2006.01) | |
| *F02P 15/06* | (2006.01) | |
| *F02P 5/04* | (2006.01) | |
| *F02P 7/06* | (2006.01) | |
| *F02P 9/00* | (2006.01) | |
| *F02P 11/02* | (2006.01) | |

(52) U.S. Cl.
CPC ........ *F02N 11/0844* (2013.01); *F02P 5/1506* (2013.01); *F02P 11/02* (2013.01); *F02D 2250/06* (2013.01); *F02N 11/0851* (2013.01); *F02N 15/067* (2013.01); *F02N 2200/022* (2013.01); *F02N 2200/0801* (2013.01); *F02N 2200/101* (2013.01); *F02N 2200/102* (2013.01); *F02N 2250/04* (2013.01); *F02P 5/045* (2013.01); *F02P 7/06* (2013.01); *F02P 9/005* (2013.01); *Y02T 10/46* (2013.01); *Y02T 10/48* (2013.01)

(58) Field of Classification Search
CPC ............... F02D 41/062; F02D 2250/06; F02D 2013/0292; F02D 37/02; F02D 13/0234; F02D 2200/101; F02D 31/001; F02D 41/0005; F02D 41/30; F02N 19/005; F02N 11/0814; F02N 2200/021; F02N 2200/041; F02N 11/00; F02N 99/002; F02N 15/06; F02N 2250/04; B60W 2510/0685; F01L 2800/01; F01L 2820/042; F02P 5/1506; F02P 5/15
See application file for complete search history.

(56) References Cited

U.S. PATENT DOCUMENTS

| | | | | |
|---|---|---|---|---|
| 9,133,776 B2* | 9/2015 | Shimizu | ............. | F02D 13/0238 |
| 9,151,239 B2* | 10/2015 | Mikawa | ............. | F02D 13/0238 |
| 2004/0149251 A1* | 8/2004 | Nishikawa | ............ | F02D 41/042 123/198 DB |
| 2005/0172939 A1* | 8/2005 | Masaoka | ................ | F02P 11/02 123/603 |
| 2006/0048734 A1* | 3/2006 | Kataoka | ................ | B60K 6/485 123/179.4 |
| 2006/0102127 A1* | 5/2006 | Izumi | ................ | F02D 13/0226 123/179.18 |
| 2006/0190161 A1* | 8/2006 | Nakamura | ..................... | 701/114 |
| 2008/0072860 A1* | 3/2008 | Nakamura et al. | ........ | 123/179.4 |
| 2008/0103683 A1* | 5/2008 | Tabata et al. | ................. | 701/112 |
| 2008/0105230 A1* | 5/2008 | Kishibata | ............. | F02D 41/062 123/179.5 |
| 2009/0037085 A1* | 2/2009 | Kojima | ................ | F02N 99/006 701/113 |
| 2009/0048050 A1* | 2/2009 | Kamada | ................ | B60K 6/442 475/150 |
| 2009/0063008 A1* | 3/2009 | Ishikawa | ................... | F02N 3/04 701/102 |
| 2009/0076704 A1* | 3/2009 | Tokugawa | ................ | F02P 5/15 701/102 |
| 2010/0006078 A1* | 1/2010 | Shoda | ............ | 123/676 |
| 2010/0212633 A1* | 8/2010 | Ishikawa et al. | ........ | 123/406.23 |
| 2010/0319666 A1* | 12/2010 | Usukura | ................ | F02P 11/02 123/631 |
| 2010/0326389 A1* | 12/2010 | Okumoto et al. | ......... | 123/179.4 |
| 2011/0056450 A1* | 3/2011 | Notani | ....................... | 123/179.4 |
| 2011/0120789 A1* | 5/2011 | Teraya | ....................... | 180/65.25 |
| 2011/0146609 A1* | 6/2011 | Enoki | ......................... | 123/179.3 |

FOREIGN PATENT DOCUMENTS

| | | |
|---|---|---|
| JP | 2009-126330 A | 6/2009 |
| JP | 2010-209759 A | 9/2010 |
| JP | 2011-220114 A | 11/2011 |

OTHER PUBLICATIONS

Communication dated Oct. 20, 2016 from the German Patent and Trademark Office in counterpart Application No. 10 2012 213 959.1, 7 pages.

\* cited by examiner

ENGINE AUTOMATIC STOP/RESTART DEVICE

BACKGROUND OF THE INVENTION

Technical Field

The present invention relates to an engine automatic stop/restart device that automatically stops an engine when an automatic stop condition is satisfied, and then restarts the engine when a restart condition is satisfied.

Background Art

Recently, an engine automatic stop/restart device has been developed in order to improve a fuel cost of a car and the like, or to decrease an environmental load, in which a fuel is automatically cut so as to automatically stop an engine, when a predetermined condition for stopping an engine, for example, "a brake pedal is pressed by a driver in a condition where a car speed is lower than a predetermined value" is satisfied, and a fuel injection is restarted so as to automatically restart the engine, when a predetermined condition for restarting the engine, for example, "a brake pedal is released by an operation of a driver, and an accelerator pedal is pressed" is satisfied.

In the conventional engine automatic stop/restart devices, there is a suggested engine automatic stop/restart device (for example, refer to Patent Document 1), in which a sensor, which can detect whether a crank shaft of an engine is reversely rotated or not after the engine is automatically stopped, is provided, and a fuel injection and ignition is suppressed when an reverse rotation of the crank shaft of the engine is detected by the sensor, whereby it is protected that the crank shaft of the engine is reversely rotated.

CONVENTIONAL ART DOCUMENT

Patent Document

[Patent Document 1]
Japanese Laid-Open Patent Publication No. 2010-209759

SUMMARY OF THE INVENTION

Problems to be Solved by the Invention

In the conventional engine automatic stop/restart device disclosed in Patent Document 1, although a fuel injection and ignition is suppressed by detecting a reverse rotation of a crank shaft of an engine when the crank shaft is reversely rotated, a suppression of an ignition is released when it is detected that the crank shaft of the engine is regularly rotated a predefined count. Therefore, when the engine is started by a starter in a state where the crank shaft of the engine is reversely rotated before the compression top dead center, a force by which the crank shaft is reversely rotated and a force by which the crank shaft is regularly rotated by using the starter are balanced, and the crank shaft becomes unstable state in which a reverse rotation mode is shifted to a regular rotation mode. There has been a problem in that the state of the crank shaft is changed to the unstable state or a mode just before the stopping near before a compression top dead center, and the reverse rotation is enhanced and a start operation is late, when the suppression for the ignition is released so as to immediately ignite in this state.

The present invention has been made to solve the above-described problems of a conventional engine automatic stop/restart device, and an object of the invention is to provide an engine automatic stop/restart device by which an ignition generation, which enhances a reverse rotation of a crank shaft of an engine, can be protected.

Means for Solving Problems

An engine automatic stop/restart device of the present invention, which automatically stops an engine when a car is running and an automatic stop condition is satisfied, and then restarts the engine when a restart condition is satisfied, includes a crank-angle sensor that detects a crank angle of the engine and outputs a crank-angle signal; a fuel injector for injecting fuel into the engine; an igniter for igniting the engine; an ignition-control unit for controlling the igniter; an ignition-prohibition-decision unit that prohibits an ignition for the engine, which is controlled by the ignition-control unit, when a reverse rotation of the engine is detected based on the crank-angle signal outputted from the crank-angle sensor; and an ignition-prohibition-release-decision unit that releases an ignition prohibition, after the ignition is prohibited by the ignition-prohibition-decision unit; wherein the ignition-prohibition-release-decision unit releases the ignition prohibition when regular rotational signals of the engine, of which count is greater than or equal to a predetermined count, is detected and an engine revolution number is greater than or equal to a predetermined revolution number, after the reverse rotation of the engine is detected, and before a crank is positioned at a compression top dead center of the engine.

Moreover, the engine automatic stop/restart device of the present invention, which automatically stops an engine when a car is running and an automatic stop condition is satisfied, and then restarts the engine when a restart condition is satisfied, includes a crank-angle sensor that detects a crank angle of the engine and outputs a crank-angle signal; a fuel injector for injecting fuel into the engine; an igniter for igniting the engine; an ignition-control unit for controlling the igniter; an ignition-prohibition-decision unit that prohibits an ignition for the engine, which is controlled by the ignition-control unit, when a reverse rotation of the engine is detected based on the crank angle outputted from the crank-angle sensor; an ignition-prohibition-release-decision unit that releases an ignition prohibition, after the ignition is prohibited by the ignition-prohibition-decision unit; and a starter that is energized so as to start the engine, when a revolution number of the engine is lower than a predetermined revolution number; wherein the ignition-prohibition-release-decision unit releases the ignition prohibition set by the ignition-prohibition-decision unit, when the unit detects regular rotational signals of the engine, of which count is greater than or equal to a predetermined count, and detects that an energization for the starter is started and a predetermined time has elapsed, before a crank is positioned at a compression top dead center of the engine.

Effects of the Invention

According to the engine automatic stop/restart device of the present invention, the device detects the predetermined number of the regular-rotation signals after the reverse rotation of the engine is detected and before the compression top dead center, and releases the ignition prohibition when the engine revolution number is greater than or equal to a predetermined revolution number, whereby the releasing of the ignition prohibition can be protected in a state where the crank shaft is set at an unstable state between the reverse rotation and the regular rotation, and an ignition generation, which enhances the reverse rotation of the crank shaft of the engine, can be protected.

Moreover, according to the engine automatic stop/restart device of the present invention, the device releases the ignition prohibition set by the ignition-prohibition-decision unit, when the unit detects regular rotational signals of the engine, of which count is greater than or equal to a predetermined count, and detects that an energization for the starter is started and a predetermined time has elapsed, before a crank is positioned at a compression top dead center of the engine, whereby an ignition can be inhibited in a state where the crank shaft is set at an unstable state between the reverse rotation and the regular rotation, and an ignition generation, which enhances the reverse rotation of the crank shaft of the engine, can be protected.

DETAILED DESCRIPTION OF THE PREFERRED EMBODIMENT

Embodiment 1

Figure 1:
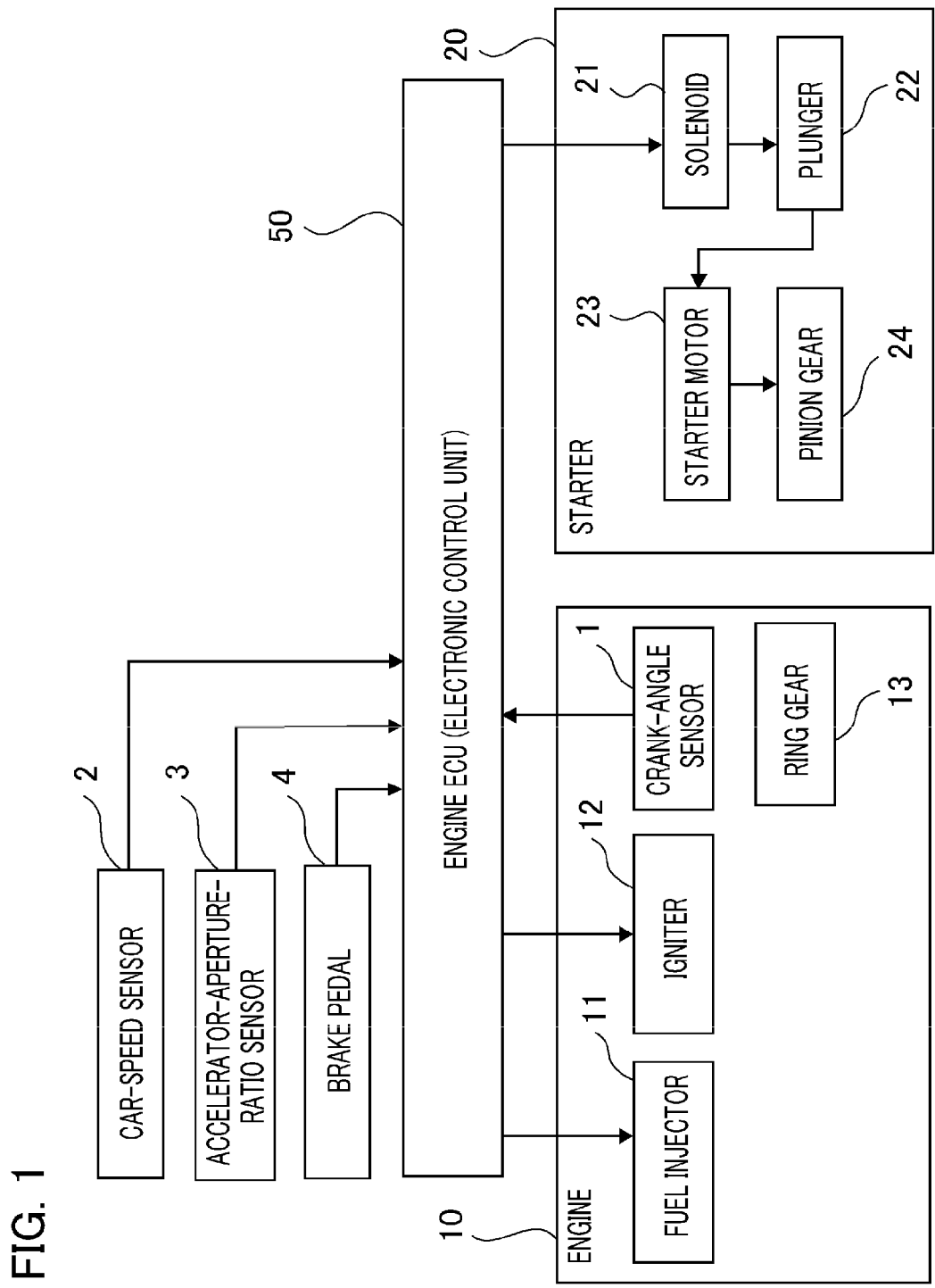
FIG. 1 is a block diagram illustrating a configuration of an engine automatic stop/restart device according to Embodiment 1 of the present invention.

Hereinafter, an engine automatic stop/restart device according to Embodiment 1 of the present invention will be explained in reference to the drawings. FIG. 1 is a block diagram illustrating a configuration of an engine automatic stop/restart device according to Embodiment 1 of the present invention. In addition, reference symbols, which are the same as those in FIG. 1 and each of drawings described later, refer to the same or equivalent parts.

In FIG. 1, the engine automatic stop/restart device according to Embodiment 1 of the present invention includes an engine 10, a starter 20, and an engine ECU 50. The engine 10 includes a fuel injector 11 for injecting fuel, an igniter 12 for igniting and burning the injected fuel, a crank-angle sensor 1 for detecting a crank angle, which is a rotational angle of a crank shaft, and for outputting a crank-angle signal, and a ring gear 13 linked to the crank shaft.

The starter 20 includes a starter motor 23 that is rotated by being energized, a pinion gear 24 that is provided around a rotational shaft of the starter motor 23, a plunger 22 that ejects the pinion gear 24 in a shaft direction of the rotational shaft so as to be engaged to the ring gear 13 of the engine 10, and a solenoid 21 that moves the plunger 22 in the shaft direction by being engaged.

The engine ECU (Electronic Control Unit) 50 includes various interface circuits (not illustrated) and a microcomputer (not illustrated). The engine ECU 50 is connected to the crank-angle sensor 1 for outputting the crank-angle signal, a car-speed sensor 2 for detecting a traveling speed of a car so as to output a car-speed signal, an accelerator-aperture-ratio sensor 3 for detecting an aperture ratio of an accelerator so as to output an accelerator-aperture-ratio signal, and a brake pedal 4 for outputting a brake signal corresponding to an operation mode of a brake, whereby the crank-angle signal, the car-speed signal, the accelerator-aperture-ratio signal, and brake signal, which are output signals of these units, are inputted to the microcomputer via the interface circuits.

The microcomputer of the engine ECU 50 includes an analog-to-digital converter (not illustrated) that converts the inputted analog signals, which are outputted signals from the various sensors, into digital signals; a CPU (not illustrated) that executes various control programs such as an engine automatic stop/restart control program and the like; a ROM (not illustrated) that memorizes various control programs such as the engine automatic stop/restart control program and the like, control constants, and various tables; and a RAM (not illustrated) that memorizes variables and the like, which are used when various control programs are executed.

The engine ECU 50, configured as described above, controls the fuel injector 11 and igniter 12 of the engine 10 based on the inputted signals outputted from the various sensors and the like so as to control output of the engine 10. Moreover, the engine ECU 50 judges whether a predetermined engine-stop condition for stopping the engine 10 is satisfied or not, and automatically cuts fuel when the engine-stop condition is satisfied. Next, the engine ECU 50 judges whether a predetermined engine-restart condition for restarting the engine 10 is satisfied or not, and resumes a fuel injection by the fuel injector 11 and transmits an energization command to the starter 20 when the engine-restart condition is satisfied.

In this situation, the predetermined engine-stop condition indicates, for example, "the brake pedal 4 is pressed by a driver in a condition where a car speed is lower than a predetermined value", and the predetermined engine-restart condition indicates, for example, "the brake pedal 4 is released and an accelerator pedal is pressed by operations of the driver".

When the energization command is transmitted from the engine ECU 50 to the starter 20, the solenoid 21 is firstly connected to a power supply and energized. The energized solenoid 21 drives the plunger 22 so as to move the pinion gear 24 in the shaft direction, and engages the pinion gear 24 to the ring gear 13. Next, when the engagement of the ring gear 13 and the pinion gear 24 is terminated, the starter motor 23 is connected to a power supply so as to be energized. The energized starter motor 23 rotates the pinion gear 24, and rotates the ring gear 13 engaged to the pinion gear 24 so as to restart the engine 10.

Figure 2:
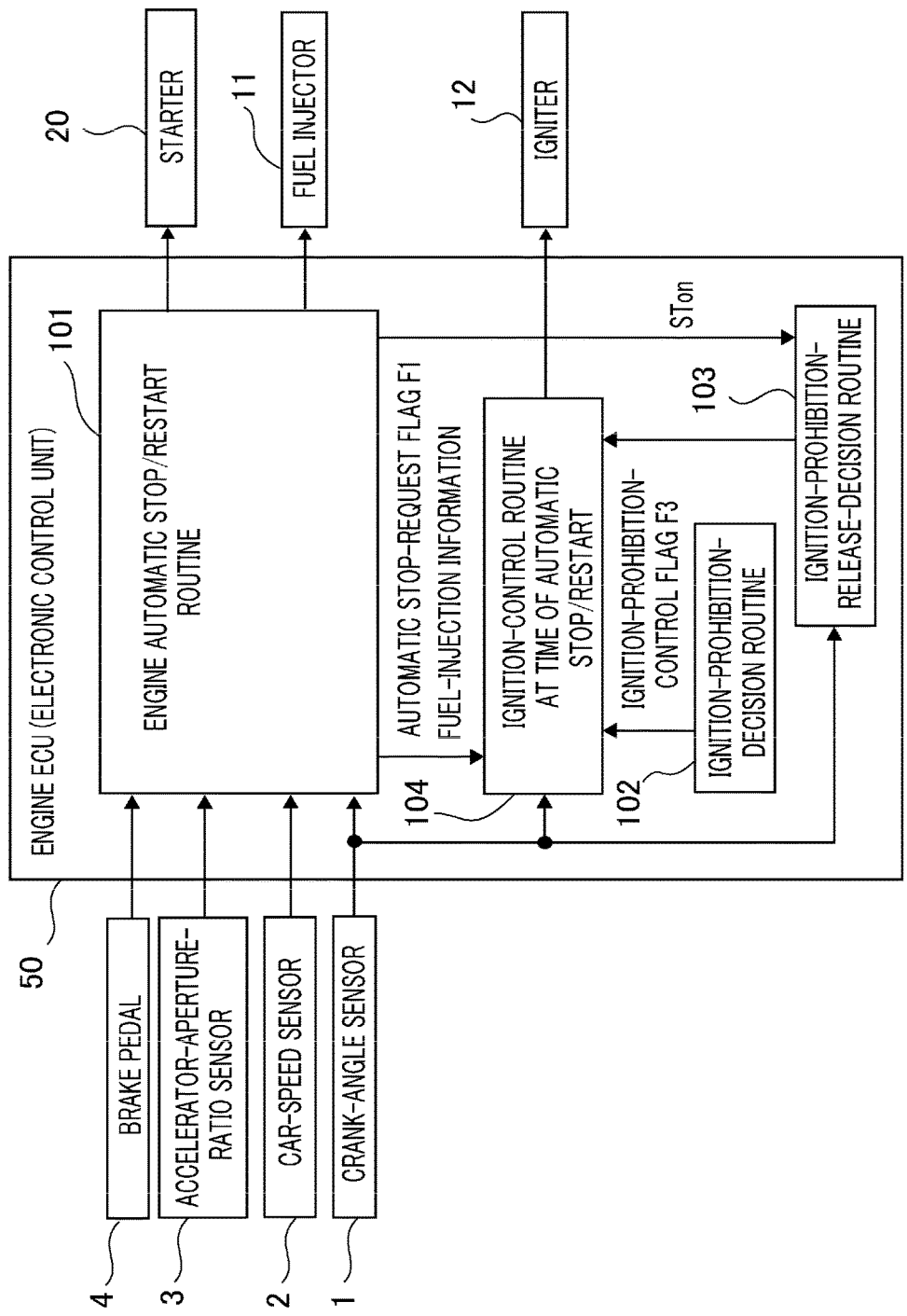
FIG. 2 is a control block diagram of the engine automatic stop/restart device according to Embodiment 1 of the present invention.

FIG. 2 is a control block diagram of the engine automatic stop/restart device according to Embodiment 1 of the present invention, and a configuration of each process routine is indicated in FIG. 2. In FIG. 2, an engine automatic stop/restart routine 101 provided in the engine ECU 50 firstly judges, by using information based on output signals of car-speed sensor 2, the accelerator-aperture-ratio sensor 3, the brake pedal 4 and the like, whether an automatic stop condition for the engine 10 is satisfied or not, and when it is judged that the automatic stop condition for the engine 10 is satisfied, the engine automatic stop/restart routine 101 stops the fuel injection by the fuel injector 11 so as to top the engine 10. After the engine 10 is automatically stopped, the engine automatic stop/restart routine 101 judges, by using information based on output signals of the accelerator-aperture-ratio sensor 3, the brake pedal 4 and the like, whether an automatic restart condition for the engine 10 is satisfied or not, and when it is judged that the automatic restart condition for the engine 10 is satisfied, the engine automatic stop/restart routine 101 restarts the fuel injection by the fuel injector 11 and provides an instruction for energizing the starter 20 so as to restart the engine 10 as described above.

When the engine automatic stop/restart routine 101 judges that the automatic stop condition for the engine 10 is satisfied, an automatic stop-request flag F1 is set as "1", and an automatic stop-request for the engine 10 is displayed as "existing". Moreover, at this time, an automatic under suspension flag F2 is set as "1".

An ignition-prohibition-decision routine 102 used as an ignition-prohibition-decision unit judges whether a fuel ignition by the igniter 12 must be prohibited or not by using information, which is determined based on the output signal of the crank-angle sensor 1, about whether a rotational direction of the crank shaft is a regular rotation or a reverse direction; and when it is judged that an ignition prohibition must be performed, an ignition-prohibition-decision flag F3 is set as "1". An ignition-prohibition-release-decision routine 103 judges whether the ignition prohibition must be released or not by using information, which is determined based on the output signal of the crank-angle sensor 1, about whether the rotational direction of the crank shaft is a regular rotation or a reverse direction.

Figure 3:
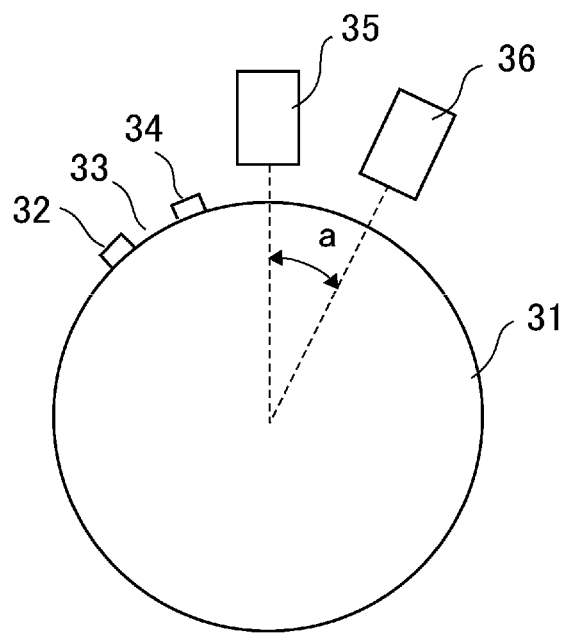
FIG. 3 is a schematic diagram of a crank-angle sensor of the engine automatic stop/restart device according to Embodiment 1 of the present invention.

Hereinafter, the crank-angle sensor 1 will be explained. FIG. 3 is a schematic diagram of a crank-angle sensor of the engine automatic stop/restart device according to Embodiment 1 of the present invention. In FIG. 3, the crank-angle sensor 1 is composed of a rotor 31 that is connected to the crank shaft of the engine 10 so as to be rotated in synchronization with a rotation of the crank shaft, and a first sensor 35 and a second sensor 36, which are faced in such a way that the sensors sandwich a predetermined counter gap above an outer circumferential of the rotor 31.

The rotor 31 connected to the crank shaft of the engine 10 includes a plurality of teeth 32 and 34 configured by a magnetic material on the outer circumference as illustrated in FIG. 3, and a gap is provided between the neighboring teeth 32 and 34. Although two teeth 32 and 34 are illustrated in FIG. 3, 36 teeth are practically formed on the outer circumference of the rotor 31, which are evenly spaced, for example, 10 angle-degrees apart.

Each of the first sensor 35 and the second sensor 36 includes, for example, a magnetoresistive element (hereinafter, refer to MR element) for converting a variation of magnetic flux into an electric signal, and converts a variation of magnetic flux, which is generated by alternatively passing the teeth of the rotor 31 and the gap through the facing gap, into an electric signal so as to be outputted. The first sensor 35 and the second sensor 36 are displaced "a" angle-degree each other so as to be arranged around a center axis of the rotor 31, and the rotational direction of the crank shaft is gained, as described later, in reference to a temporal relationship between the output signals of the first sensor 35 and the second sensor 36.

Figure 4:
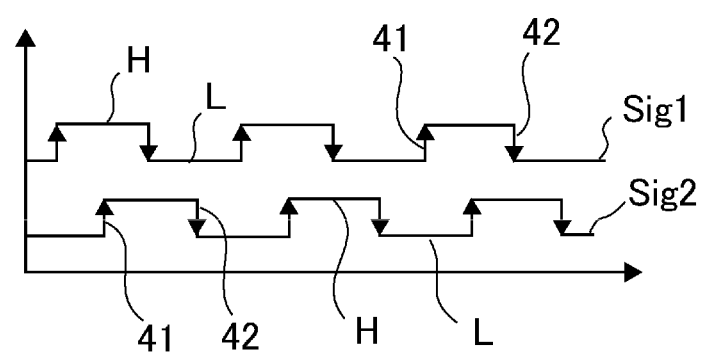
FIG. 4 is an explanatory diagram illustrating signal characteristics of the crank-angle sensor of the engine automatic stop/restart device according to Embodiment 1 of the present invention.

FIG. 4 is an explanatory diagram illustrating signal characteristics of the crank-angle sensor of the engine automatic stop/restart device according to Embodiment 1 of the present invention. In FIG. 4, signal levels are indicated along a vertical axis, and times are indicated along a horizontal axis. In FIG. 3 and FIG. 4, when the rotor 31 is rotated in a clockwise direction in synchronization with the rotation of the crank shaft, the teeth 32 and 34 as well as the gap 33 are passed through the counter gap between the first sensor 35 and the second sensor 36, whereby a rectangle-shaped first trigger signal "Sig1" and second trigger signal "Sig2", which are output signals, are respectively generated from the first sensor 35 and the second sensor 36 as illustrated in FIG. 4.

Levels of the first trigger signal Sig1 and the second trigger signal Sig2 are alternately varied to a high level (hereinafter, refer to H level) or a low level (hereinafter, refer to L level) at regular intervals. In the first trigger signal Sig1 and the second trigger signal Sig2 illustrated in FIG. 4, an edge rising from the L level to the H level is indicated as "41", and an edge falling from the H level to the L level is indicated as "42".

The engine ECU judges a rotational direction of the crank shaft, as described below, based on a variation of the levels of the first trigger signal Sig1 and the second trigger signal Sig2.

TABLE 1

| Sig1 | Sig2 | Rotational direction of crank shaft |
|---|---|---|
| H → L | L | Reverse rotation |
| L → H | H | Reverse rotation |
| H | H → L | Reverse rotation |
| L | L → H | Reverse rotation |
| H → L | H | Regular rotation |
| L → H | L | Regular rotation |
| H | L → H | Regular rotation |
| L | H → L | Regular rotation |

As indicated in Table 1, the rotational direction of the crank shaft can be judged by combing the rising edge 41 or the falling edge 42 of one of the trigger signals and the level H or the level L of the other trigger signal. For example, when the first trigger signal Sig1 indicates the falling edge 42 ("H level"→"L level") and the second trigger signal Sig2 indicates "H level", it can be judged that the rotational direction of the crank shaft is "regular rotation". FIG. 4 indicates a case in which a rotation of the crank shaft is a regular rotation.

In addition, the above-described configuration of the crank-angle sensor 1 indicates one example, and any configuration may be used, even if a rotational direction of the engine 10 can be judged.

The ignition-prohibition-release-decision routine 103 will be explained by returning to FIG. 2. The ignition-prohibition-release-decision routine 103 used as an ignition-prohibition-release-decision unit judges whether a prohibition of the ignition by the igniter 12 must be released or not by using information about an energization time of the starter 20, information about an engine revolution number calculated based on crank-angle-signal information from the crank-angle sensor 1, and information, which is determined based on the first trigger signal Sig1 and the second trigger signal Sig2 outputted from the crank-angle sensor 1, about whether a rotational direction of the crank shaft is a regular rotation or a reverse direction.

Next, an ignition-control routine 104 at time of automatic stop/restart, which is used as an ignition-control unit, controls the igniter 12, at a time of automatically stopping the engine or at a time of automatically restarting the engine, by using the engine automatic stop/restart routine 101, the ignition-prohibition-decision routine 102, and the ignition-prohibition-release-decision routine 103.

Figure 5:
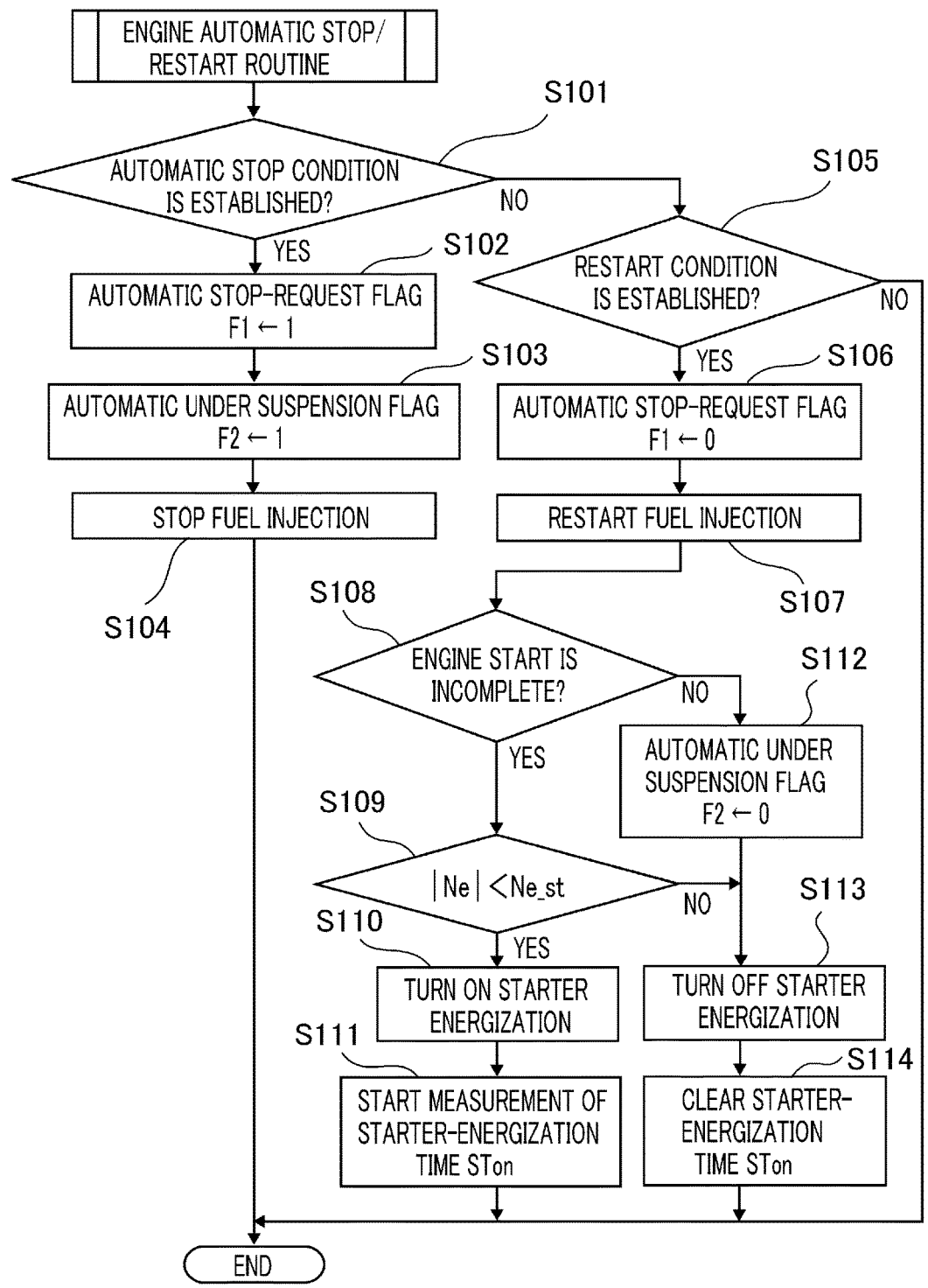
FIG. 5 is a flowchart illustrating an engine automatic stop/restart routine in the engine automatic stop/restart device according to Embodiment 1 of the present invention.
Figure 6:
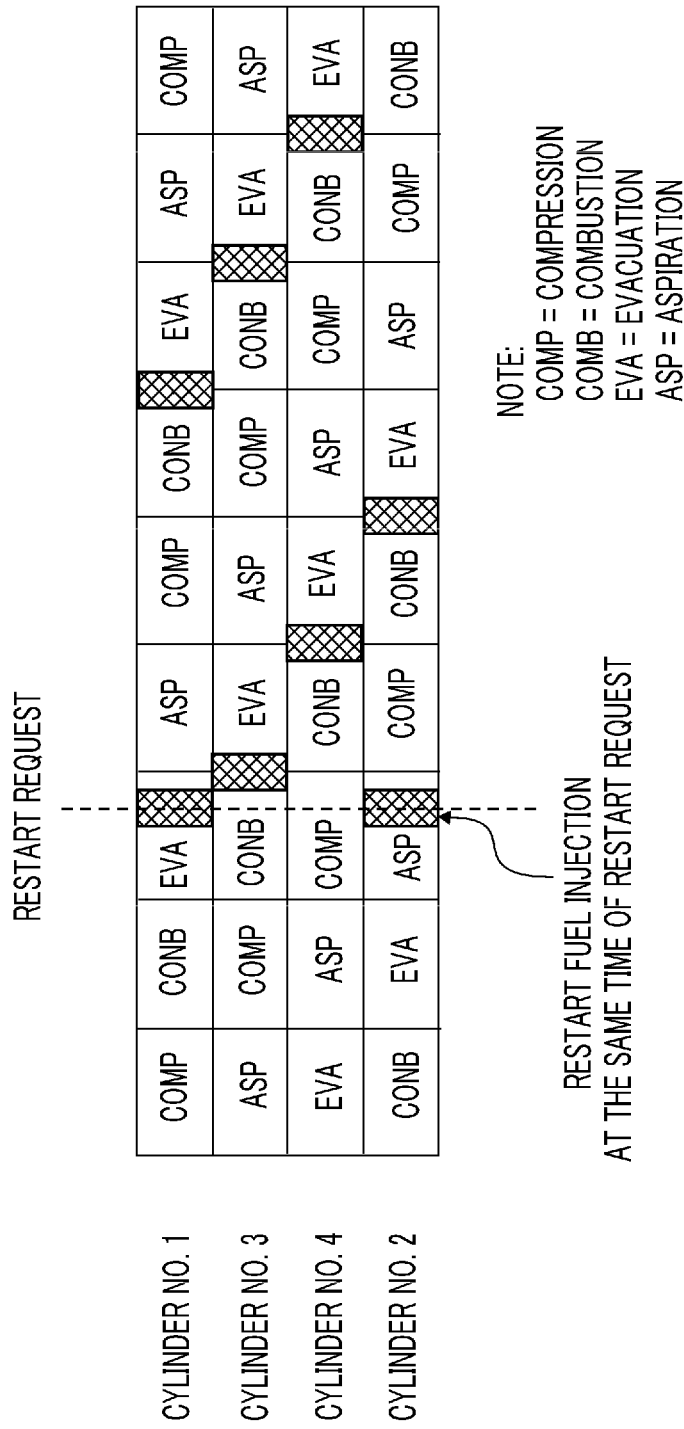
FIG. 6 is an explanatory diagram illustrating a fuel injection, at time of restarting an engine, in the engine automatic stop/restart device according to Embodiment 1 of the present invention.
Figure 7:
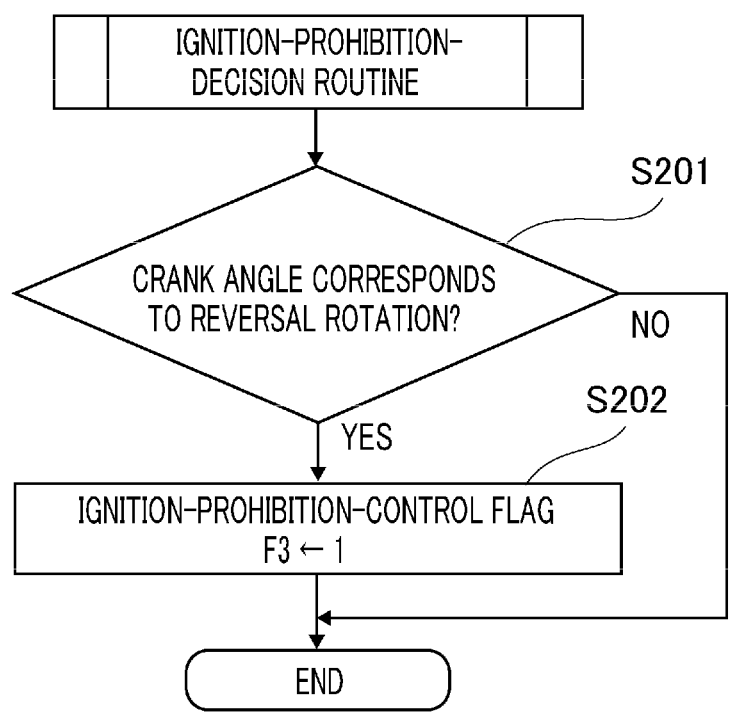
FIG. 7 is a flowchart illustrating an ignition-prohibition-decision routine in the engine automatic stop/restart device according to Embodiment 1 of the present invention.

Next, operations of the engine automatic stop/restart device according to Embodiment 1 of the present invention will be explained in reference to FIG. 5 through FIG. 9. Processes indicated in these figures are executed at constant intervals of, for example, 5 milliseconds in FIG. 5, and executed at, for example, every 10 angle-degree with respect to each input signal of the crank-angle sensor 1 in FIG. 7 through FIG. 9. In FIG. 5 through FIG. 7, processes in steps S101 through S114, steps S201 through S202, steps S301 through S309, and steps S401 through S406 are executed by an engine automatic stop/restart control program installed in a ROM of the engine ECU 50.

When an ignition switch of a car is turned on, operations of the engine ECU 50 is started by receiving an electric power from a battery mounted on the car, a CPU configured in a microcomputer provided in the engine ECU 50 executes the engine automatic stop/restart control program installed in the ROM as described below.

Firstly, a detailed process in the engine automatic stop/restart routine 101 indicated in FIG. 2 will be explained. FIG. 5 is a flowchart illustrating an engine automatic stop/restart routine in the engine automatic stop/restart device according to Embodiment 1 of the present invention. In step 101 in FIG. 5, the microcomputer (hereinafter, simply refer to engine control unit) in the engine ECU 50 judges whether an automatic stop condition is satisfied or not.

The automatic stop condition indicates, for example, an operation state and the like, in which a car speed is lower than 10 km/h, and a driver presses the brake pedal 4. The car speed is determined based on a car-speed signal outputted from the car-speed sensor 2, and the operation state, in which the brake pedal 4 is pressed, is determined based on a state "on". When the automatic stop condition is satisfied (judgment result is YES), the process proceeds to step S102; and when the automatic stop condition is not satisfied (judgment result is NO), the process proceeds to step S102.

When the process proceeds to step S102 in reference to a judgment result YES at step S101, the automatic stop-request flag F1 is set as "1" by the engine ECU 50, and the process proceeds to step S103. At step S103, the automatic under suspension flag F2 is set as "1" by the engine ECU 50, and the process proceeds to step S104. At step S104, the engine ECU 50 controls the fuel injector 11 so as to stop a fuel injection to the engine 10, and the process in the engine automatic stop/restart routine 101 is terminated.

On the other hand, when the process proceeds to step S105 in reference to a judgment result NO at step S101, the engine ECU 50 judges whether a restart condition is satisfied or not. The restart condition indicates, for example, an operation state, in which a driver releases the brake pedal 4, another operation state and the like, in which the driver presses an acceleration pedal. The operation state, in which a driver releases the brake pedal 4, is set based on "OFF" state of a brake signal outputted from the brake pedal 4, and operation state, in which the driver presses an acceleration pedal, is set based on an accelerator-aperture-ratio signal outputted from the accelerator-aperture-ratio sensor 3. When the restart condition is satisfied (judgment result is YES) in reference to a judgment result at step S105, the process proceeds to next step S106, and when the restart condition is not satisfied (judgment result is NO), the process in the engine automatic stop/restart routine 101 is terminated.

When the process proceeds to step S106 in reference to the judgment result YES at step S105, the automatic stop-request flag F1 is cleared and set as "0" by the engine ECU 50, and the process proceeds to step S107. The engine ECU 50 controls the fuel injector 11 so as to inject a starting fuel into the engine 10 at step 107, and the process proceeds to step S108.

Hereinafter, a fuel injection at the time of restarting the engine 10 will be explained. FIG. 6 is an explanatory diagram illustrating a fuel injection, at time of restarting an engine, in the engine automatic stop/restart device according to Embodiment 1 of the present invention. FIG. 6 indicates the fuel injection in a case where the engine 10 includes 4 cylinders, and crosshatched areas in FIG. 6 indicate fuel-injection timing. Although the fuel injection is interrupted when the engine 10 is automatically stopped, if a restart request of the engine 10 is caused at timing indicated by a dashed line so as to restart the engine 10, fuel injections are restarted in a predetermined plurality of cylinders (for example, cylinder No. 1 working at an evacuating progression and cylinder No. 2 working at an aspirating progression) at the same time, and the fuel injection is restarted at predetermined timing (at every timing where a crank angle BTDC of a cylinder working at a combusting progression is 5 angle-degree) since then.

At step S108 returned in FIG. 5, the engine ECU 50 judges, by referring the engine revolution number, whether the engine 10 is started or not. When the engine 10 is not started, in other words, when the engine revolution number is lower than a predetermined value (judgment result is YES), the process proceeds to step S109. On the other hand, when the engine 10 is started, in other words, when the engine revolution number is greater than or equal to the predetermined value (judgment result is NO), it is judged that the engine 10 is started by combusting a fuel, and the process proceeds to step S112. In this situation, the predetermined value for judging the start of the engine 10 is, for example, 600 rpm.

When the process proceeds to step S109 in reference to a judgment result YES at step S108, the engine ECU 50 judges whether an absolute value of an engine revolution number Ne is lower than a revolution-number-threshold value Ne_st or not. When the absolute value of the engine revolution number Ne is lower than the revolution-number-threshold value Ne_st (judgment result is YES), the process proceeds to next step S110, and when the absolute value of the engine revolution number Ne is greater than or equal to the revolution-number-threshold value Ne_st (judgment result is NO), the process proceeds to step S113. In this situation, the revolution-number-threshold value Ne_st of the engine 10 is, for example, 50 rpm.

When the process proceeds to step S110 in reference to the judgment result YES at step S109, the engine ECU 50 transmits the energization command to the starter 20, and the energization for the starter 20 is turned on. A timing measurement in reference to a starter-energization time STon is started at step S111, and the process in the engine automatic stop/restart routine 101 is terminated.

When the energization for the starter 20 is turned on at step S110, an energization for the solenoid 21 is firstly performed in the starter 20. Thereby, the solenoid 21 drives the plunger 22 in a shaft direction and pushes out the pinion gear 24 in the shaft direction, and the pinion gear 24 is engaged to the ring gear 13. Next, when the engagement of the pinion gear 24 and the ring gear 13 is finished, the energization for the starter motor 23 is performed. The energized starter motor 23 rotates the pinion gear 24, and the engine 10 is restarted by rotating the ring gear 13 engaged to the pinion gear 24.

On the other hand, when the process proceeds to step S112 in reference to the judgment result NO at step S108, the automatic under suspension flag F2 is cleared and set as "0" by the engine ECU 50, and the process proceeds to step S113. The engine ECU 50 causes a command for stopping the energization for the starter 20, and the energization for the starter 20 is turned off. Next, after the process proceeds to step S114, the timing measurement in reference to a starter-energization time STon is cleared, and the process in the engine automatic stop/restart routine 101 is terminated.

Moreover, when the process proceeds to step S113 in reference to a judgment result NO at step S109, the engine ECU 50 causes the command for stopping the energization for the starter 20, and the energization for the starter 20 is turned off. Next, after the process proceeds to step S114, the timing measurement in reference to a starter-energization time STon is cleared, and the process in the engine automatic stop/restart routine 101 is terminated.

Hereinafter, a detailed process in the ignition-prohibition-decision routine 102 illustrated in FIG. 2 will be explained. FIG. 7 is a flowchart illustrating an ignition-prohibition-decision routine in the engine automatic stop/restart device according to Embodiment 1 of the present invention. At step S201 in FIG. 7, the engine ECU 50 judges, as illustrated in the Table 1 based on a level difference between the first trigger signal Sig1 and the second trigger signal Sig2 which are inputted from the crank-angle sensor 1, whether the crank shaft is reversely rotated or not. When the crank shaft is reversely rotated (judgment result is YES), the process proceeds to step S202, whereas when the crank shaft is regularly rotated (judgment result is NO), the process in the ignition-prohibition-decision routine 102 is terminated.

When the process proceeds to step S202 in reference to the judgment result YES at step S201, the ignition-prohibition-decision flag F3 is set as "1" by the engine ECU 50, and the process in the ignition-prohibition-decision routine 102 is terminated.

Figure 8:
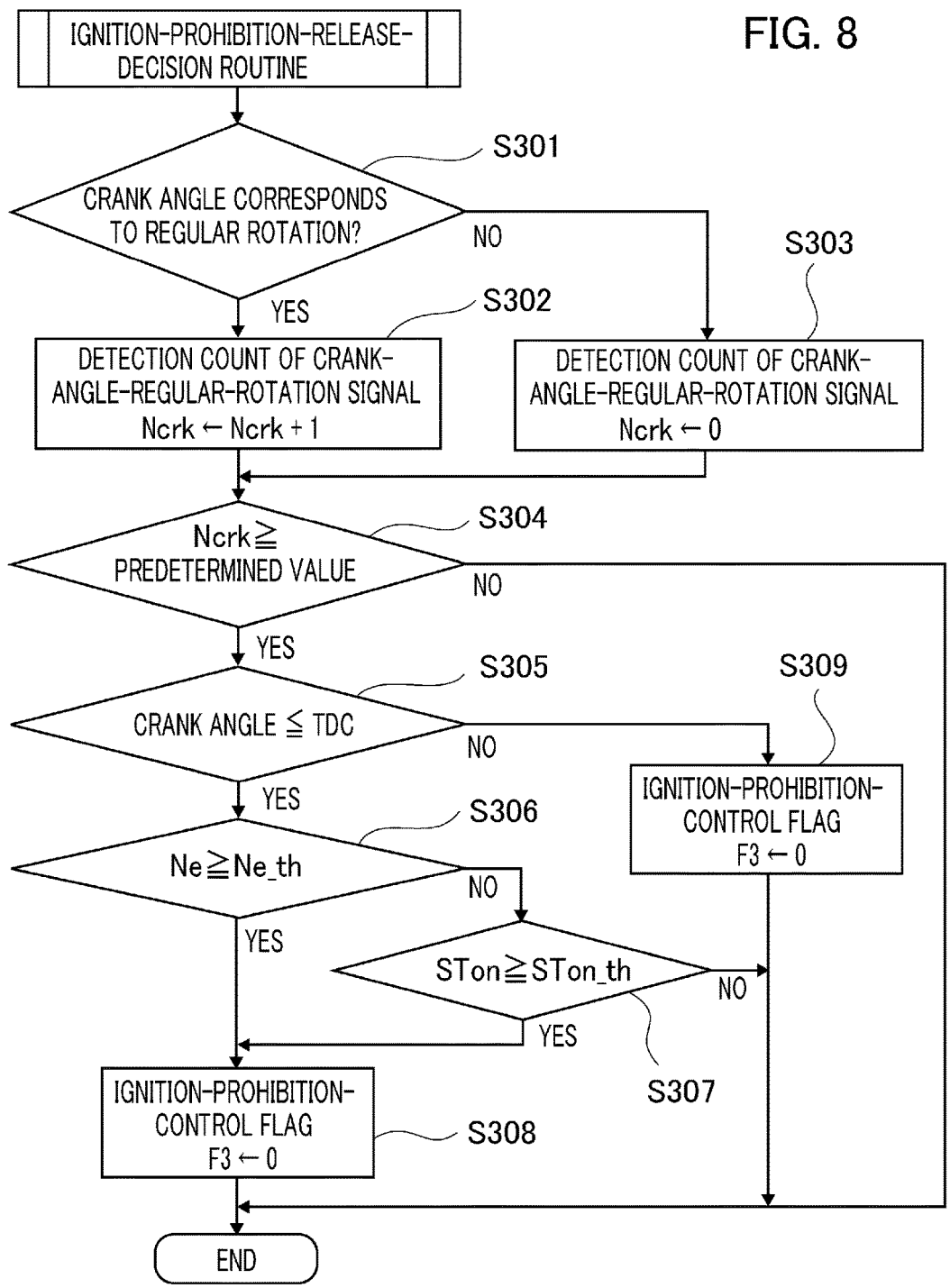
FIG. 8 is a flowchart illustrating an ignition-prohibition-release-decision routine in the engine automatic stop/restart device according to Embodiment 1 of the present invention.

Hereinafter, a detailed process in the ignition-prohibition-release-decision routine 103 illustrated in FIG. 2 will be explained. FIG. 8 is a flowchart illustrating an ignition-prohibition-release-decision routine in the engine automatic stop/restart device according to Embodiment 1 of the present invention. At step S301 in FIG. 8, the engine ECU 50 judges, as illustrated in the Table 1 based on a level difference between the first trigger signal Sig1 and the second trigger signal Sig2 which are inputted from the crank-angle sensor 1, whether the crank shaft is regularly rotated or not. When the crank shaft is regularly rotated (judgment result is YES), the process proceeds to step S302, whereas when the crank shaft is reversely rotated (judgment result is NO), the process proceeds to step S303.

When the process proceeds to step S302 in reference to the judgment result YES at step S301, the engine ECU 50 adds "1" to a crank-angle-regular-rotation-detection count Ncrk, and the process proceeds to step S304. On the other hand, when the process proceeds to step S303 in reference to the judgment result NO at step S301, the crank-angle-regular-rotation-detection count Ncrk is cleared and set as "0", and the process proceeds to step S304.

When the process proceeds to step S304, the engine ECU 50 judges whether the crank-angle-regular-rotation-detection count Ncrk is greater than or equal to a preset and predetermined value or not. When the crank-angle-regular-rotation-detection count Ncrk is greater than or equal to the predetermined value (judgment result is YES), the process proceeds to step S305, whereas when the crank-angle-regular-rotation-detection count Ncrk is lower than the predetermined value (judgment result is NO), the process in the ignition-prohibition-release-decision routine 103 is terminated. In this situation, a predetermined value used for the judgment at step S304, or a threshold value for the crank-angle-regular-rotation signal, is, for example, 2 times.

When the process proceeds to step S305 in reference to a judgment result YES at step S304, the engine ECU 50 judges whether the crank angle, detected by the crank-angle sensor 1, corresponds to a position before a compression top dead center (TDC) of the crank or not. When the crank angle corresponds to the position before the compression top dead center (TDC) (judgment result is YES), the engine ECU 50 determines that a rotational state is unstable even if the engine ECU 50 detects the predetermined number of the crank-angle-regular-rotation signals, and the process proceeds to step S306. When the crank angle corresponds to a position after the compression top dead center (TDC) (judgment result is NO), the process proceeds to step S309, and the ignition-prohibition-decision flag F3 is cleared by using "0", and then the process in the ignition-prohibition-decision routine 102 is terminated.

Next, when the process proceeds to step S306 in reference to a judgment result YES at step S305, the engine ECU 50 judges whether the engine revolution number Ne is greater than or equal to a predetermined value. When the engine revolution number Ne is greater than or equal to the predetermined value (judgment result is YES), the engine ECU 50 determines that the engine is certainly and regularly rotated even if the crank angle corresponds to the position before the compression top dead center (TDC), the process proceeds to step S308. On the other hand, when the engine revolution number Ne is lower than the predetermined value (judgment result is NO), the process proceeds to step S307.

When the process proceeds to step S307 in reference to a judgment result NO at step S306, the engine ECU 50 judges whether a starter-energization time STon is greater than or equal to a predetermined time or not. When the starter-energization time STon is greater than or equal to the predetermined time (judgment result is YES), it is judged that the crank shaft is certainly and regularly rotated, and the process proceeds to step S308. On the other hand, when the starter-energization time STon is lower than predetermined time (judgment result is NO), the process in the ignition-prohibition-decision routine 102 is terminated. In this situation, a judgment-threshold value for the starter-energization time STon at step S307 indicates time in which the engine is certainly driven after an energization for the starter 20 is started, and the judgment-threshold value is, for example, 100 milliseconds.

When the process proceeds to step S308 in reference to a judgment result YES at step S306 or in reference to a judgment result YES at step S307, the engine ECU 50 clears the ignition-prohibition-decision flag F3 by using "0", and then the process in the ignition-prohibition-decision routine 102 is terminated.

Figure 9:
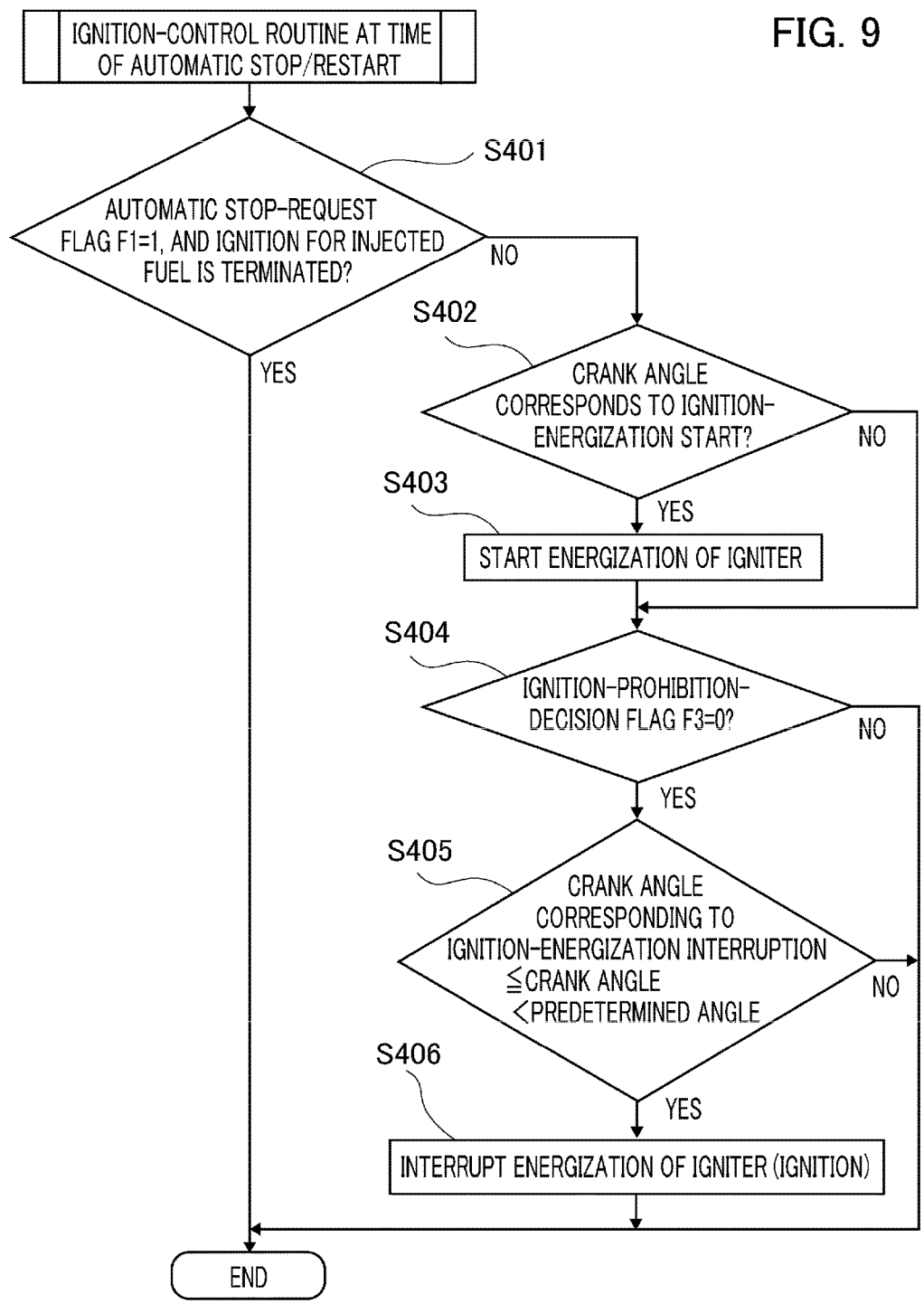
FIG. 9 is a flowchart illustrating an ignition-control routine at time of automatic stop/restart in the engine automatic stop/restart device according to Embodiment 1 of the present invention.

Hereinafter, a detailed process in the ignition-control routine 104 at time of automatic stop/restart illustrated in FIG. 2 will be explained. FIG. 9 is a flowchart illustrating an ignition-control routine at time of automatic stop/restart in the engine automatic stop/restart device according to Embodiment 1 of the present invention. At step S401 in FIG. 9, it is judged whether the automatic stop-request flag F1 is set as "1", and an ignition for the injected fuel is terminated or not. When the automatic stop-request flag F1 is set as "1", and the ignition for the injected fuel is terminated (judgment result is YES), an ignition process is not performed, and the process in the ignition-control routine 104 is terminated. When the automatic stop-request flag F1 is set as "0", and the ignition for the injected fuel is not terminated (judgment result is NO), the process proceeds to step S402. In this situation, a cylinder, in which fuel is already injected, is memorized when a fuel injection is stopped at step S104 in FIG. 5, and it is judged that an ignition for the injected fuel is terminated by judging that an ignition for the cylinder, in which fuel is already injected, is performed or not.

When the process proceeds to step S402 in reference to the judgment result NO at step S401, the engine ECU 50 judges whether the crank angle detected by the crank-angle sensor 1 corresponds to an angle at which the energization for the igniter is started. When the crank angle corresponds to the angle at which the energization for the igniter is started (judgment result is YES), the process proceeds to step S403. When the crank angle doesn't correspond to the angle at which the energization for the igniter is started (judgment result is NO), the process proceeds to step S404. In this situation, the angle, at which the energization for the igniter is started, corresponds to, for example, 75 degree before a compression top dead center (BTDC).

When the process proceeds to step S403 in reference to the judgment YES at step S402, the engine ECU 50 starts the energization for the igniter of the cylinder in which a compressing progression is performed to prepare the ignition, and the process proceeds to step S404.

Next, when the process proceeds to step S404 in reference to the judgment result NO at step S402 or proceeds to step S404 from step S402, the engine ECU 50 judges whether the ignition-prohibition-decision flag F3 is "0" or not. When the ignition-prohibition-decision flag F3 is "0" (judgment result is YES), it is determined that the engine is operated in an ignition-permission state, and the process proceeds to step S405. When the ignition-prohibition-decision flag F3 is "1" (judgment result is NO), it is determined that the engine is operated in an ignition-prohibition state, and the process in the ignition-control routine 104 is terminated.

When the process proceeds to step S405 in reference to the judgment result YES at step S404, the engine ECU 50 judges whether the crank angle detected by the crank-angle sensor 1 is greater than or equal to an energization-interruption angle, in other words, an ignition angle and lower than a predetermined angle or not. When the crank angle is greater than or equal to the energization-interruption angle and lower than the predetermined angle (judgment result is YES), the process proceeds to step S406. When the crank angle is lower than the energization-interruption angle or greater than or equal to the predetermined angle (judgment result is NO), the process in the ignition-control routine 104 is terminated. In this situation, the energization-interruption angle is, for example, 5 degree before a compression top dead center (BTDC), and the predetermined angle is 55 degree after a compression top dead center (ATDC).

Next, at step 406, the engine ECU 50 interrupts the energization of the igniter for which the energization was started at step 403, and an ignition is performed.

Figure 12:
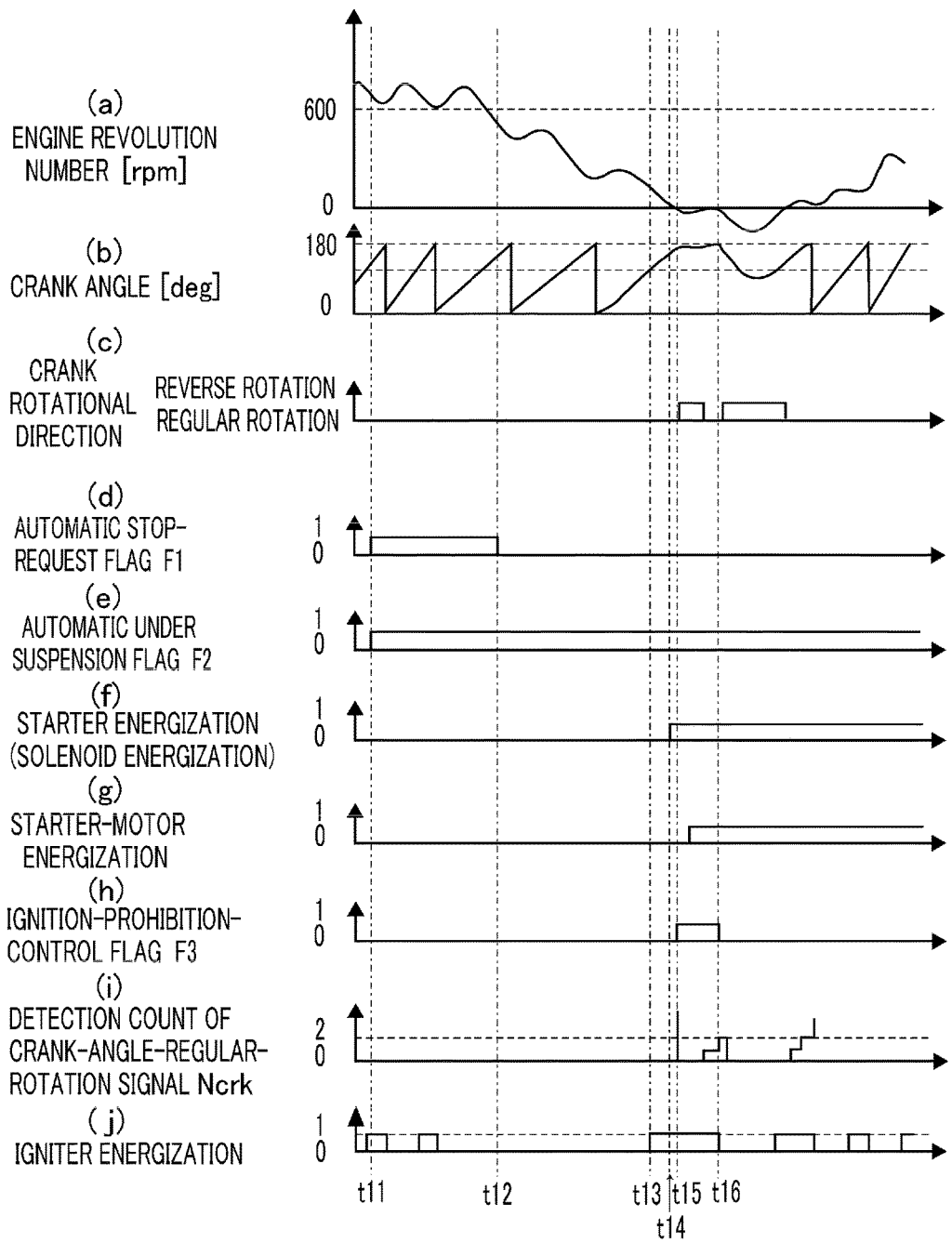
FIG. 12 indicates timing charts illustrating operations of a conventional engine automatic stop/restart device.

Hereinafter, operations of an engine automatic stop/restart device will be explained along time indicated in timing charts. Firstly, operations of a conventional device described in Patent Document 1 will be explained, before operations of the engine automatic stop/restart device according to Embodiment 1 of the present invention will be explained. FIG. 12 indicates timing charts illustrating operations of the conventional engine automatic stop/restart device. In the conventional engine automatic stop/restart device disclosed in the above-described Patent Document 1, operations are indicated, in which an engine is automatically stopped in a state where a car has been running, and a fuel ignition is restated when a restart condition is satisfied based on operations of a driver during the engine is inertially rotated, and a pinion gear and a ring gear is engaged by staring an inergization for a starter when an engine revolution number is lower than a predetermined value during the engine is rotated, and then the engine is restarted by cranking a starter motor.

In FIG. 12, the timing chart (a) indicates an engine revolution number Ne, and the timing chart (b) indicates a temporal progression of crank angles repeated every 180 angle-degree in a situation where a top dead center of the crank angles of the engine is 0 angle-degree, which are measured by a crank-angle sensor with respect to the engine having 4 cylinders. The timing chart (c) indicates a rotational direction of a crank shaft, which is detected by the crank-angle sensor, and "1" is set in a case where the rotational direction is a reverse rotation, whereas "0" is set in a case where the rotational direction is a regular rotation.

The timing chart (d) indicates a state of an automatic stop-request flag F1, and "1" is set to the flag F1 when an automatic stop condition is satisfied, whereas "0" is set to the flag F1 when a restart condition is satisfied. The timing chart (e) indicates a state of an automatic under suspension flag F2, and "1" is set to the flag F2 when an engine 10 is automatically stopped, whereas "0" is set to the flag F2 when the starting of the engine 10 is terminated.

The timing chart (f) indicates an inergization state of a starter 20 as well as a temporal progression of an inergization state of a solenoid 21. The timing chart (g) indicates a temporal progression of an inergization state of a starter motor 23. In this case, the inergization state of the starter motor 23 is experimentally gained by using a sensor.

The timing chart (h) indicates a state of an ignition-prohibition-decision flag F3, and "1" is set to the flag F3 when an ignition-prohibition-decision condition is satisfied, whereas "0" is set to the flag F1 when an ignition-prohibition-decision condition is not satisfied. The timing chart (i) indicates a temporal progression of a detection count for crank-angle-regular-rotation signals, and the timing chart (j) indicates a temporal progression of an inergization state of an igniter 12.

In the conventional device described in Patent Document 1, as illustrated in FIG. 12, when the crank-angle sensor, which can detect whether the crank shaft of the engine is reversely rotated or not, detects that the crank shaft of the engine is reversely rotated (at time t15), the ignition is suppressed during the reversal rotation. However, the rotation of the crank shaft of the engine is changed to the regular rotation, and when a predetermined count (2 times) of crank-angle signal in a regular rotation state, the suppression for the ignition is released (at time t16). In this situation, when the engine is started by a starter in a state where the crank shaft of the engine is reversely rotated before the compression top dead center, a force by which the crank shaft is reversely rotated and a force by which the crank shaft is regularly rotated by using the starter are balanced, and the crank shaft becomes unstable state in which a reverse rotation mode is shifted to a regular rotation mode, so that there has been a problem in that the reverse rotation is enhanced and a start operation is late when the suppression for the ignition is released so as to immediately ignite before the compression top dead center.

Figure 10:
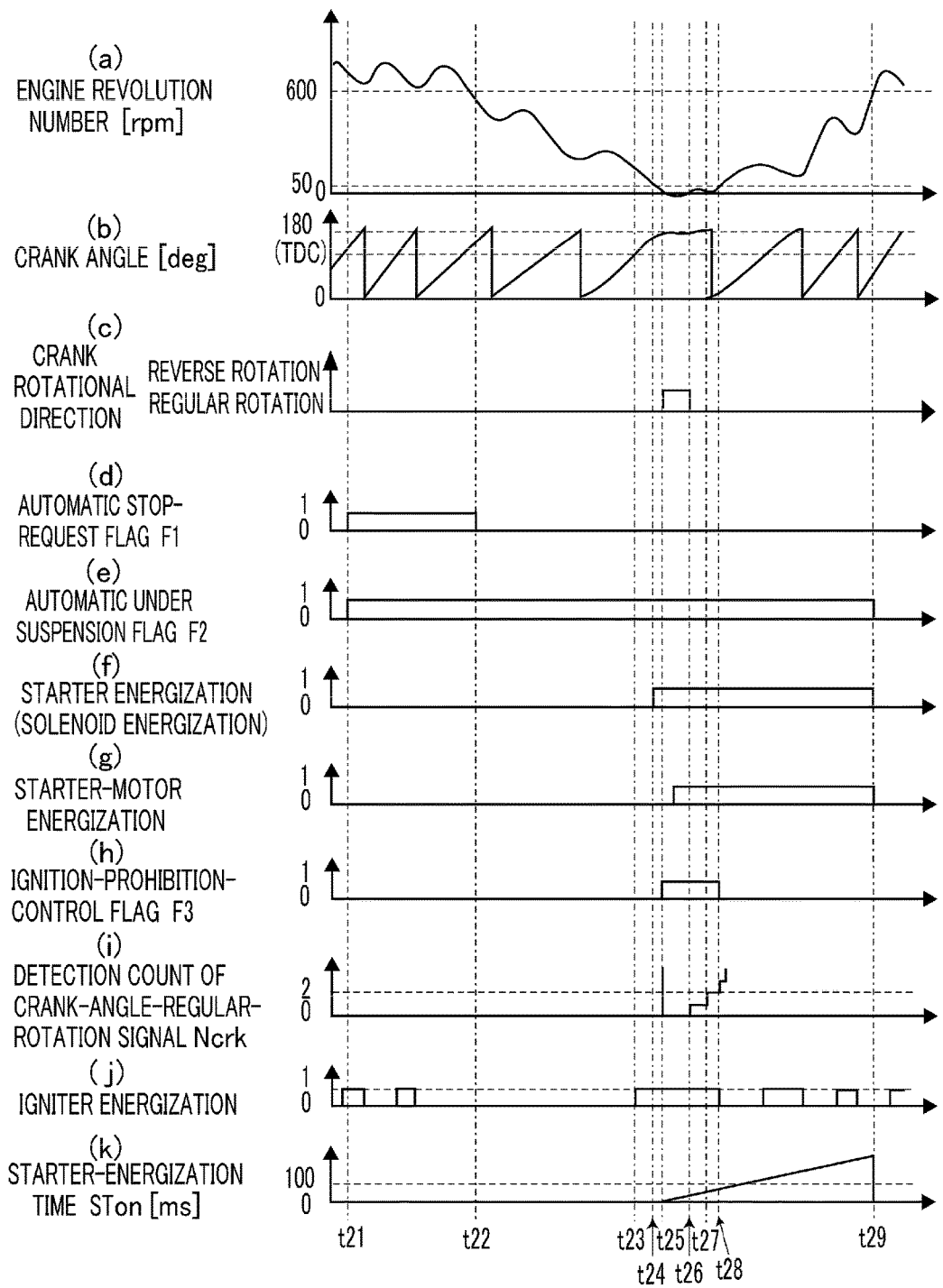
FIG. 10 indicates timing charts illustrating operations of an engine, at time of automatically stopping-restarting, in the engine automatic stop/restart device according to Embodiment 1 of the present invention.
Figure 11:
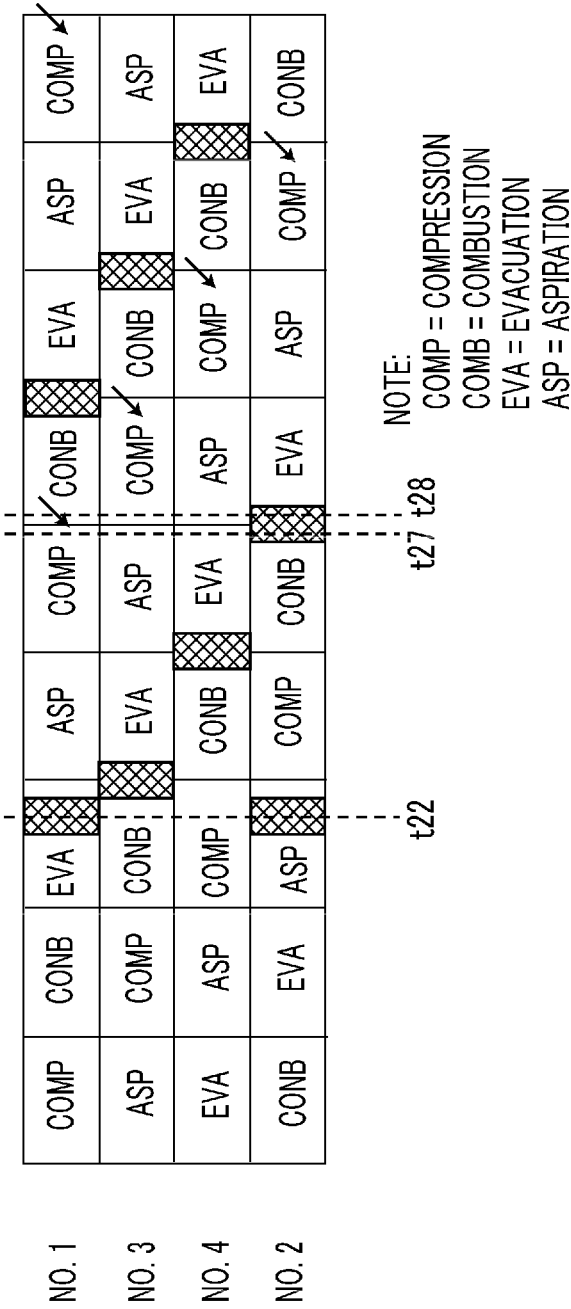
FIG. 11 is an explanatory diagram illustrating operations of fuel injections and ignitions of an engine, in the engine automatic stop/restart device according to Embodiment 1 of the present invention.

Next, FIG. 10 indicates timing charts illustrating operations of an engine, at time of automatically stopping-restarting, in the engine automatic stop/restart device according to Embodiment 1 of the present invention. In FIG. 10, operations are indicated as illustrated in FIG. 12, in which an engine is automatically stopped in a state where a car has been running, and a fuel ignition is restated when a restart condition is satisfied based on operations of a driver during the engine is inertially rotated, and the pinion gear 24 and the ring gear 13 is engaged by staring an inergization for the starter 20 when an engine revolution number is lower than a predetermined value during the engine is rotated, and then the engine is restarted by cranking the starter motor 23. FIG. 11 is an explanatory diagram illustrating operations of fuel injections and ignitions of an engine, in the engine automatic stop/restart device according to Embodiment 1 of the present invention.

In FIG. 10, the timing chart (a) indicates an engine revolution number Ne, and the timing chart (b) indicates a temporal progression of crank angles repeated every 180 angle-degree in a situation where a top dead center of the crank angles of the engine is 0 angle-degree, which are measured by a crank-angle sensor with respect to the engine having 4 cylinders. The timing chart (c) indicates a rotational direction of a crank shaft, which is detected by the crank-angle sensor, and "1" is set in a case where the rotational direction is a reverse rotation, whereas "0" is set in a case where the rotational direction is a regular rotation.

The timing chart (d) indicates a state of an automatic stop-request flag F1, and "1" is set to the flag F1 when an automatic stop condition is satisfied, whereas "0" is set to the flag F1 when a restart condition is satisfied. The timing chart (e) indicates a state of an automatic under suspension flag F2, and "1" is set to the flag F2 when the engine 10 is automatically stopped, whereas "0" is set to the flag F2 when the starting of the engine 10 is terminated.

The timing chart (f) indicates an inergization state of the starter 20 as well as a temporal progression of an inergization state of the solenoid 21. The timing chart (g) indicates a temporal progression of an inergization state of the starter motor 23. In this case, the inergization state of the starter motor 23 is experimentally gained by using a sensor.

The timing chart (h) indicates a state of an ignition-prohibition-decision flag F3, and "1" is set to the flag F3 when an ignition-prohibition-decision condition is satisfied, whereas "0" is set to the flag F1 when an ignition-prohibition-decision condition is not satisfied. The timing chart (i) indicates a temporal progression of a detection count for crank-angle-regular-rotation signals, and the timing chart (j) indicates a temporal progression of an inergization state of the igniter 12. The timing chart (k) indicates a temporal progression of the inergization time STon for the starter 20. In addition, these timing charts (a) through (j) respectively correspond to the timing charts (a) through (j) in the above-described FIG. 10.

In FIG. 10, at time t21, after an automatic stop condition is satisfied, "1" is set to the automatic stop-request flag F1 indicated in the timing chart (d) and the automatic under suspension flag F2 indicated in the timing chart (e), and the fuel injection is stopped (refer to steps S101 through S104 in FIG. 5).

Next, at time t22, a restart condition is satisfied by driver operations, and the automatic stop-request flag F1 indicated in the timing chart (d) is cleared and set as "0", and then the fuel injection is restarted (refer to steps S105 through S107 in FIG. 5).

Next, at time t23 as indicated in FIG. 10, the inergization for the igniter is started in order to prepare an ignition for a cylinder in which the fuel injected at time t22 is aspirated (refer to steps S401 through S403 in FIG. 9).

Next, at time t24, the engine revolution number is lower than a predetermined revolution number for which the starter 20 can be operated, and the inergization for the starter 20 is started (refer to steps S108 through S111 in FIG. 5).

Next, at time t25, a reverse rotation of the crank shaft of the engine is detected by the crank-angle sensor 1, and "1" is set to the ignition-prohibition-decision flag F3 indicated in the timing chart (h), and the engine becomes a state in which the ignition is prohibited. The crank-angle-regular-rotation-detection count Ncrk indicated in the timing chart (i) is cleared and set as "0" (refer to steps S201 through S202 in FIG. 7, and steps S301 and S303 in FIG. 8).

Next, at time t26, a regular rotation of the crank shaft of the engine is detected by the crank-angle sensor 1, and the crank-angle-regular-rotation-detection count Ncrk is increased (refer to steps S301 through S302 in FIG. 8).

Next, at time t27, it is detected by the crank-angle sensor 1 that the crank angle reaches to an ignition angle. However, although the crank-angle-regular-rotation-detection count Ncrk becomes a predetermined count (2 times), the crank is positioned before the compression top dead center (TDC), and the engine revolution number is lower than a predetermined value (50 rpm), and moreover, the inergization time STon for the starter 20 is lower than a predetermined value (100 milliseconds), so that it is not satisfied that the crank shaft is certainly and regularly rotated. Therefore, the ignition-prohibition-decision flag F3 remains "1", and the ignition is not performed (refer to steps S304 through S307 in FIG. 8, step S404 in FIG. 9, and the time t27 in FIG. 12).

Next, at time t28, the count for the regular rotation of the crank shaft detected by the crank-angle sensor 1 is greater than a predetermined count (2 times), and the crank angle exceeds the compression top dead center (TDC), so that the ignition-prohibition-decision flag F3 is cleared and set as "0", and an ignition-prohibition state is released. In this situation, although the crank angle exceeds an intrinsic ignition angle, the inergization for the igniter 12 is interrupted, and the ignition is performed. Thereby, the fuel injected at time t22 is ignited, and a rotation in a regular rotational direction is caused by a combustion of the fuel (refer to steps S304 through S305 and S309 in FIG. 8, steps S404 through S406 in FIG. 9, and the time t28 in FIG. 12).

Next, at time t29, the engine revolution number exceeds an engine-start-termination-decision-revolution number (600 rpm), and the engine restart is terminated, so that the inergization for the starter 20 is stopped, and a power of the starter 20 is lost.

As described above, the engine automatic stop/restart device according to Embodiment 1 of the present invention detects the predetermined number of the regular-rotation signals after the crank shaft of the engine is reversely rotated before the compression top dead center, and releases the ignition prohibition when the engine revolution number is greater than equal to a predetermined revolution number, whereby the releasing of the ignition prohibition can be protected in a state where the crank shaft is set at an unstable state between the reverse rotation and the regular rotation, and an ignition generation, which enhances the reverse rotation of the crank shaft of the engine, can be protected.

Moreover, the engine automatic stop/restart device according to Embodiment 1 of the present invention detects the predetermined number of the regular-rotation signals after the crank shaft of the engine is reversely rotated before the compression top dead center, and judges the releasing of the ignition prohibition when the energization time for the starter is greater than or equal to a predetermined time, whereby unnecessary continuation for an ignition-prohibition state can be protected, and a suitable restart of the engine can be realized.

Furthermore, the engine automatic stop/restart device according to Embodiment 1 of the present invention immediately performs the ignition if the crank angle is lower than a predetermined angle at which a fuel can be ignited, when the ignition of the engine is prohibited by the ignition-prohibition-decision unit, and when the ignition prohibition is released in a state where the crank shaft exceeds a predetermined ignition angle while the device is energized, whereby the suitable restart of the engine can be realized.

In addition, each of components according to Embodiment 1 of the present invention can be suitably modified or omitted within the scope of the present invention.

What is claimed is:

1. An engine automatic stop/restart device that automatically stops an engine when a car is running and an automatic stop condition is satisfied, and then restarts the engine when a restart condition is satisfied, the engine automatic stop/restart device comprising:
   a crank-angle sensor that detects a crank angle of the engine and outputs a crank-angle signal;
   a fuel injector for injecting fuel into the engine;
   an igniter for igniting the engine;
   a starter that is energized to start the engine when the restart condition is satisfied and an engine revolution number is lower than a first predetermined revolution number;
   a timer that is started when the starter is energized; and
   a processor programmed to control the igniter and prohibit an ignition for the engine when a reverse rotation of the engine is detected based on the crank-angle signal,
   wherein the processor is further programmed to, after the ignition has been prohibited, release an ignition prohibition for the engine by performing operations of:
      detecting whether regular rotational signals of the engine are greater than or equal to a predetermined count,
      detecting, after the reverse rotation of the engine is detected and the regular rotational signals of the engine are greater than or equal to the predetermined count, whether the crank angle is positioned just before or at a compression top dead center of the engine based on the crank-angle signal output from the crank-angle sensor,
      in response the crank angle being positioned just before or at the compression top dead center of the engine:
         detecting the engine revolution number,
         when the engine revolution number is greater than or equal to a second predetermined revolution number based on the detecting the engine revolution number, restarting the engine, and
         when the engine revolution number is smaller than the second predetermined revolution number based on the detecting the engine revolution number, restarting the engine if a time since an energization for the starter has been started is greater than or equal to a predetermined time based on the timer,
   wherein the processor is further programmed to immediately perform the ignition when the ignition prohibition is released, and when the crank angle of the engine already exceeds an ignition angle and is lower than a predetermined angle, and to terminate a release of the ignition prohibition when the time since the energization for the starter has been started is less than the predetermined time and the engine revolution number is smaller than the second predetermined revolution number or when the regular rotational signals of the engine are less than the predetermined count after the reverse rotation of the engine has been detected.

2. The engine automatic stop/restart device according to claim 1, wherein the processor is programmed to release the ignition prohibition in response to detecting a satisfaction of either a condition that the detected engine revolution number is greater than or equal to the second predetermined revolution number or a condition combination in which the detected engine revolution number is smaller than the second predetermined revolution number and the time since the energization for the starter has been started is greater than or equal to the predetermined time, when the crank angle is positioned just before or at the compression top dead center of the engine.

3. The engine automatic stop/restart device according to claim 1, wherein the predetermined count of the regular rotational signals of the engine is greater than 0, and
   the second predetermined revolution number is greater than 0 and is greater than the first predetermined revolution number.

* * * * *